W. BARKER.
SPOOL HEAD FASTENER.
APPLICATION FILED FEB. 6, 1912.
1,150,011.
Patented Aug. 17, 1915.
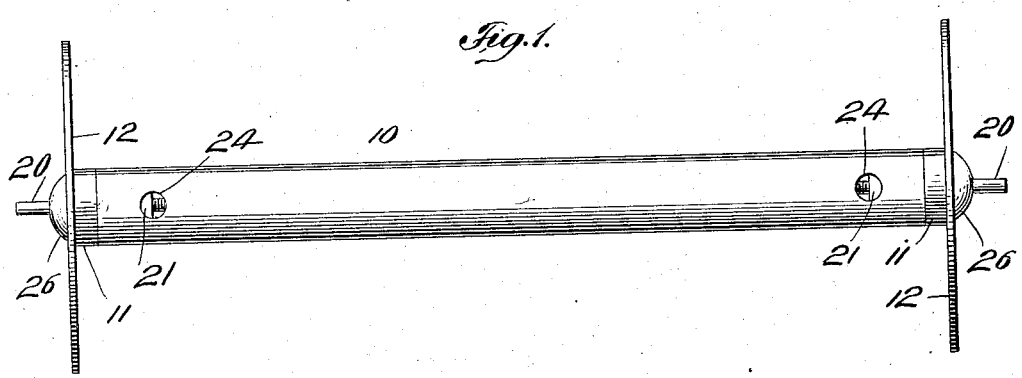
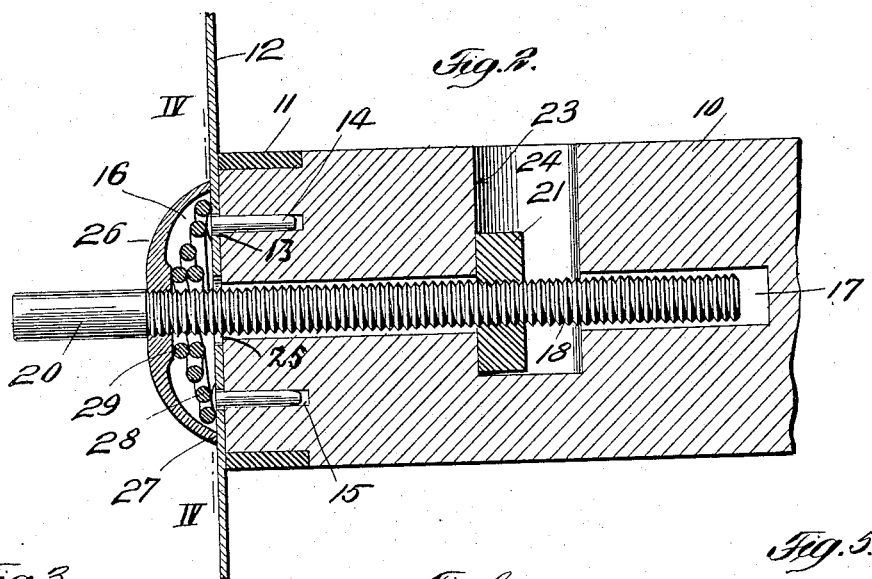
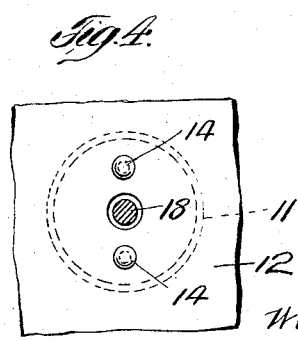
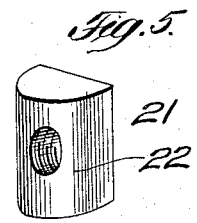
WITNESSES:
INVENTOR
William Barker
BY
Criswell&Criswell
ATTORNEY

UNITED STATES PATENT OFFICE.

WILLIAM BARKER, OF YONKERS, NEW YORK.

SPOOL-HEAD FASTENER.

1,150,011. Specification of Letters Patent. Patented Aug. 17, 1915.

Application filed February 6, 1912. Serial No. 675,798.

*To all whom it may concern:*

Be it known that I, WILLIAM BARKER, a citizen of the United States, and a resident of Yonkers, county of Westchester, and State of New York, have invented certain new and useful Improvements in Spool-Head Fasteners, of which the following is a full, clear, and exact description.

This invention relates more particularly to means for securely and removably fastening the heads to the bodies of comparatively large spools which are employed for holding yarn.

One of the principal objects of the invention is to provide simple and efficient means located at the end or ends of the spool body to rigidly and removably hold the head and spindle to the body against independent relative movement when in use, and at the same time permit the bearing spindle at each end of the spool body to rotate under the usual strain to which they are ordinarily subjected while in use without permitting the heads to become loose.

Another object of the invention is to provide simple means which is inexpensive to manufacture and which may be readily applied to lock the head, spindle and body together at either or both ends of said body and which may be readily removed.

A further object of the invention is to provide simple means which will frictionally hold the bearing spindle or spindles against accidental independent rotation.

With these and other objects in view, the invention will be hereinafter more particularly described with reference to the accompanying drawings, which form a part of this specification, and will then be pointed out in the claims at the end of the description.

In the drawings, Figure 1 is an elevation of one form of spool embodying my invention. Fig. 2 is an enlarged fragmentary section of one end of the spool. Fig. 3 is a detail plan view of one form of spring which may be employed. Fig. 4 is a transverse section taken on the line IV—IV of Fig. 2, showing one of the means for detachably holding one of the heads and preventing the same from independent movement on the spool body; and Fig. 5 is a detail perspective view of the compression nut.

The spool body 10 is usually made of wood and is provided at each end with a ferrule or band 11 and a spool head 12, the said parts being of the usual or of any preferred construction. Each head 12 is flanged for strengthening purposes and is provided with a plurality of openings 13, usually two, which are diametrically disposed with respect to each other and passing through these openings are pins 14. These pins, bolts or devices have their shanks entering openings 15 in the ends of the spool body 10 and have heads 16 usually flat to offer as little obstruction as possible. These pins 14 may be of any desired number and are readily applied to the ends of the spool body and may be as readily detached and serve as an effective means for preventing the spool heads from rotating about the body 10, at the same time permitting either or both heads to be removed.

A longitudinally extending opening 17 is arranged axially or centrally of the spool body at each end thereof, and extending into said body is a threaded stem 18 of a bearing spindle. Each bearing spindle has a part 20 serving as a bearing in the usual way, and adapted to engage the threaded stem 18 is a compression nut 21. This nut 21 has a curved body 22 which is adapted to rest and be seated against the curved part 23 of a transverse opening 24. Each opening 24 is located adjacent to one of the ends of the spool body and is adapted to intersect the longitudinally extending opening 17. This opening 24 need not extend entirely through the spool body and serves to permit the nut to be positioned to receive the threaded end of the bearing spindle and to prevent rotation of the nut. The bearing spindles each pass through a central opening 25 in one of the spool heads 12 and also pass through a threaded opening in a washer or other device 26. Each washer 26 is cup-shaped in form to provide a bearing edge or surface 27 which rests against the spool head 12. The washer 26 may rotate with or independently of its coöperating bearing spindle, and arranged within the cup portion of each washer is a spring 28. This spring 28 is preferably helical in form and may comprise a plurality of convolutions. The convolutions gradually decrease in diameter from the largest to the smallest and at the central portion may be two convolutions 29 of the same diameter. Each spring when compressed may be forced so that one or more of the convolutions will engage the spool head, and by reason of the engagement of the outer convolutions with the washer, will lock the spindle to the spool head and body.

It will be evident that by placing the nut 21 in the opening 24 and causing the threaded stem of the bearing spindle to engage said nut, the spindle may be rotated by a wrench or other means to cause the washer 26 to compress the spring 28. As the pressure increases by the rotation of the spindle, the convolutions of the spring, by reason of the frictional engagement with the head and the washer, will effectually lock the washer 26 to the spool head, and owing to the connection of the spool head through the pins 14, the said washer and spool head and body will be securely yet frictionally held together. The spring also serves to hold the washer against rotation, and by reason of the nut 21 not being held in a manner similar to the washer 26, any tendency of the spindle to rotate will be prevented because the washer will not independently rotate on the spindle to the same extent that the nut 21 will rotate or permit the threaded stem of the spindle to rotate therein, thus the several parts are securely locked together but in such a way that under the action of a wrench or similar tool, the said spindle may be released and when the threaded stem has been entirely removed from the nut 21, the bearing spindle may be removed and with it the washer and spring, at which time the spool head may be removed by the removal of the pins 14.

From the foregoing, it will be seen that simple and efficient means is provided whereby spool heads may be securely and detachably held to the ends of the spools; that said means is simple in construction and inexpensive to manufacture; that said means may be readily applied or removed; that few parts are required for properly holding the bearing spindles and parts together; and that said means may be applied to either or both ends of the spool body.

Having thus described my invention, I claim as new and desire to secure by Letters Patent:—

1. A device of the character described, comprising a spool body axially bored at its end and having a transverse opening, a compression nut located in said transverse opening, a spool head having an opening in line with the bore in the body, a spindle having a threaded stem engaging the compression nut, and passed loosely through the opening in the head, a washer having a threaded opening engaged by the threaded stem of the bearing spindle, means for holding the spool head against turning on the spool body, and a spring interposed between the spool head and the washer, and engaging said holding means for the purpose specified.

2. A device of the character described, comprising a spool body axially bored at its end and having a transverse opening, a compression nut located in said transverse opening, a spindle having a threaded stem engaging the compression nut, a washer having a threaded opening engaged by the threaded stem of the bearing spindle, and yielding means interposed between the spool head and the washer for locking the washer against turning on the spindle in use.

3. A device of the character described, comprising a spool body axially bored at its end, a compression nut located in said body, a spindle having a threaded stem engaging the nut, a cup-shaped washer mounted on the stem, and a spring housed in said washer and tending normally to hold the washer against rotation.

4. A device of the character described, comprising a spool body axially bored at its end and having a transverse opening, a compression nut located in said transverse opening, a spool head having an opening in line with the bore in the body, a spindle having a threaded stem engaging the compression nut, and passed loosely through the opening in the head, a cup-shaped washer independently movable on the spindle, means for holding the spool head against turning on the spool body, and a compression spring interposed between the spool head and housed within the cupped part of the washer, said spring engaging said holding means and also serving to lock the washer against turning on the spindle in use.

5. In a spool, a spool body bored axially at its end, and also having another bore arranged off center, a compression nut located within the body, means for preventing the rotation of said nut, a spool head having openings in line with the bores in the body, a bearing spindle having a threaded stem engaging said nut and passed loosely through the opening in the head which is in line with the axial bore in the body, a headed pin loosely engaging the other opening in the head and the other bore in the body, a washer having a threaded opening engaged by the threaded stem of the bearing spindle, and a spring interposed between the head and washer and bearing against the head of said pin for the purpose specified.

6. In a spool, a spool body bored axially at its end and provided with another bore arranged off center, a nut located within the body, means for preventing the rotation of said nut, a spool head having openings in line with the bores in said body, a bearing spindle having a threaded stem engaging said nut, and passed loosely through the center opening in the head, a pin loosely engaging the other opening in the head and the other bore in the body, a cup-shaped washer having a threaded opening engaged by the threaded stem of the bearing spindle, and a spring having a series of convolutions of different diameters housed within the cup-shaped washer and having its smaller convolutions bearing against the washer for locking it upon the spindle, the larger convolutions of the spring bearing against the pin for the purpose specified.

This specification signed and witnessed February 2 A. D. 1912.

WILLIAM BARKER.

Witnesses:
JOSEPH CHESKIE,
JOHN SMITH.

Copies of this patent may be obtained for five cents each, by addressing the "Commissioner of Patents, Washington, D. C."